Sept. 1, 1953
W. R. NEAHR ET AL
MULTIDIRECTIONAL INERTIA-OPERATED
SAFETY DEVICE FOR VEHICLE CHAIRS
2,650,655
Filed Nov. 13, 1950
2 Sheets-Sheet 1
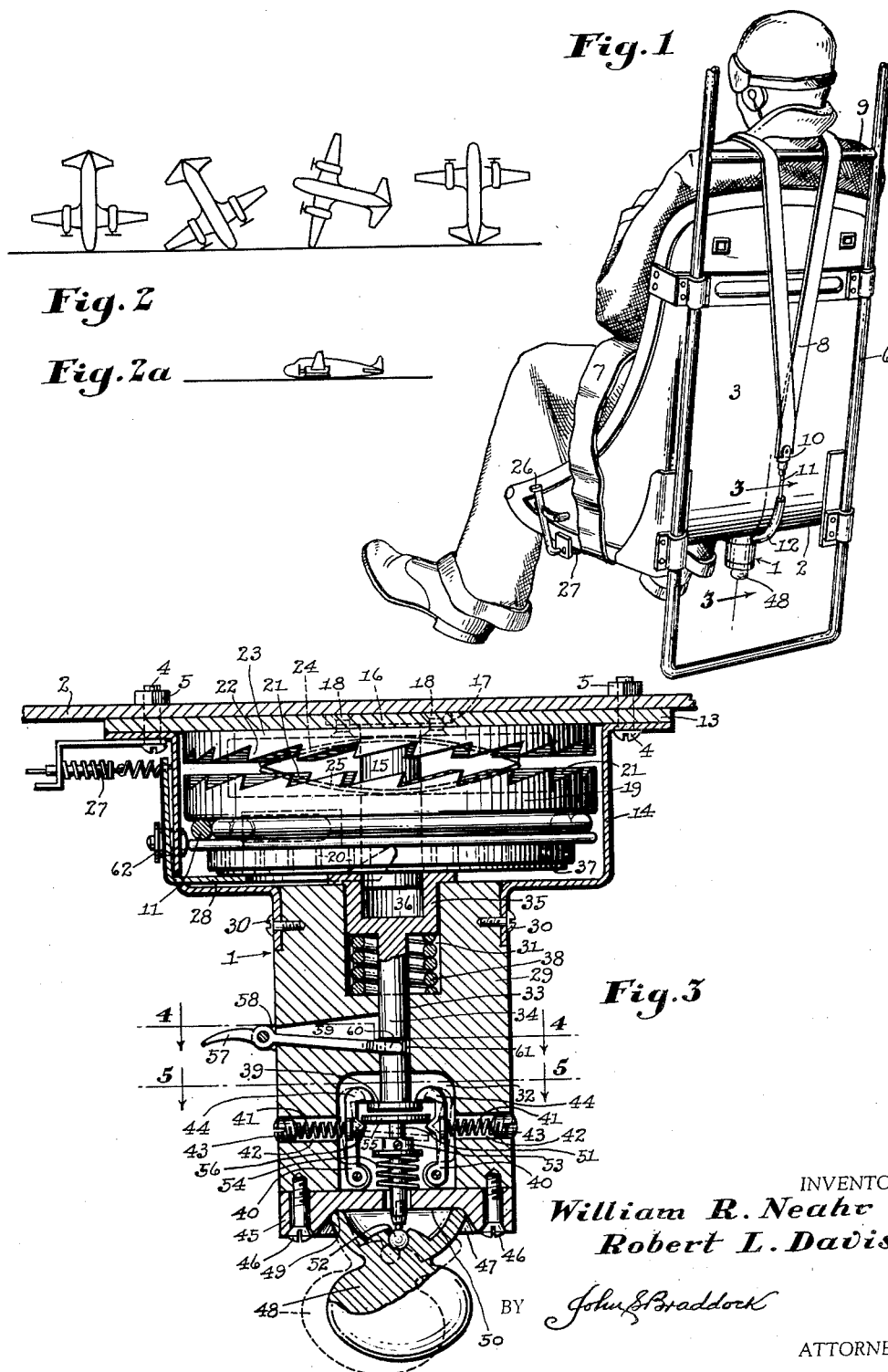
INVENTORS
William R. Neahr &
Robert L. Davis
BY John E. Braddock
ATTORNEY Sept. 1, 1953 W. R. NEAHR ET AL 2,650,655
MULTIDIRECTIONAL INERTIA-OPERATED
SAFETY DEVICE FOR VEHICLE CHAIRS
Filed Nov. 13, 1950 2 Sheets-Sheet 2
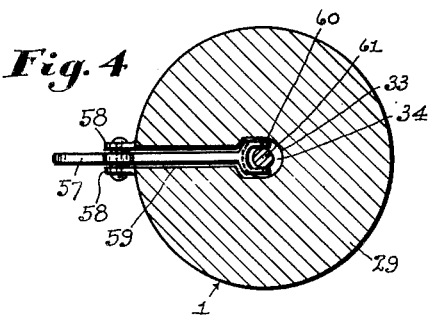
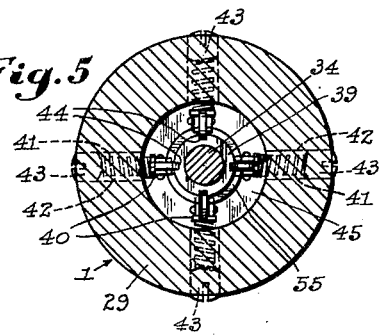
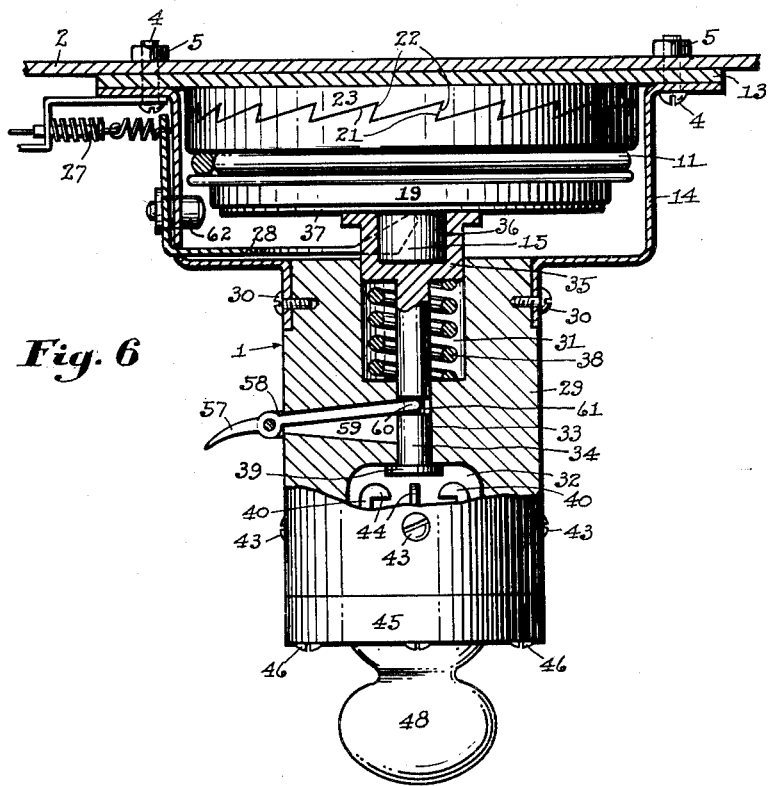
INVENTORS
William R. Neahr
Robert L. Davis
BY
John S. Braddock
Attorney Patented Sept. 1, 1953

2,650,655

UNITED STATES PATENT OFFICE 2,650,655

MULTIDIRECTIONAL INERTIA-OPERATED SAFETY DEVICE FOR VEHICLE CHAIRS

William R. Neahr and Robert L. Davis, Grand Rapids, Mich., assignors to American Seating Company, Grand Rapids, Mich., a corporation of New Jersey Application November 13, 1950, Serial No. 195,186

3 Claims. (Cl. 155—189)

1

The present invention relates to safety devices and more particularly to automatic inertia-operated reels for taking up the cable on a shoulder harness by means of which an occupant of an airplane or other vehicle is secured in his chair.

The primary objects of the invention are to provide an improved inertia-actuated safety reel of the type shown in Nordmark Patents No. 2,434,119, issued January 6, 1948, and No. 2,480,335, issued August 30, 1949; to provide such a reel which is multidirectionally inertia-operable to lock the occupant in his chair in event of collision, crash-landing or other emergency, that is to say a reel which will automatically lock the occupant in his chair regardless of the directional impact of the vehicle against any external object.

Prior safety reels of the inertia-actuated type have operated to lock an airplane pilot, or other vehicle occupant, in his chair only in the event of a head-on collision of the vehicle with some external object (including the earth). However, it sometimes happens, and more frequently with airplanes than with other vehicles, that an initial crash takes place otherwise than head-on. In such instances the chair occupant is not so likely to be thrown forward by inertia against the instrument panel of the vehicle as in the case of a head-on crash, but it is nevertheless desirable that he be immediately locked in his seat so that he will not be thrown sidewise or forward in the vehicle in the event of a subsequent crash as when an airplane rebounds and crashes a second and perhaps a third and a fourth time, all in different directions.

The present reel is therefore constructed so as to lock by inertia under varidirectional impact of the vehicle with some external object.

An illustrative embodiment of the invention is shown in the accompanying drawings, wherein:

Figure 1 is a side and rear perspective view of an airplane pilot's chair showing a pilot seated therein and a safety shoulder harness passing over the pilot's shoulders and downwardly in the rear of the chair to operative connection with the new automatic reel mounted underneath the chair seat;

Figures 2 and 2a are diagrammatic illustrations of various directions or positions which an airplane might assume in crash-landing;

Figure 3 is an enlarged vertical sectional view of the new automatic reel, taken on line 3—3 of Figure 1, and showing certain parts in their unlocked position;

2

Figure 4 is a horizontal sectional view of the same taken on line 4—4 of Figure 3;

Figure 5 is a horizontal sectional view of the same taken on line 5—5 of Figure 3; and Figure 6 is a view partly in side elevation and partly in section similar to Figure 3, and showing certain parts of the reel in their locked positions.

Referring now in detail to these drawings, the automatic inertia-locking safety reel there shown is principally enclosed within a housing or support generally designated 1 here shown secured to the underside of the seat 2 of an airplane pilot's chair 3 as by means of bolts 4 and nuts 5 (see Figure 3). The chair 3 is fixedly secured to a tubular metal frame 6 (see Figure 1) which is securely mounted in the airplane by means not shown. The chair has associated therewith the usual lapbelt 7 and a shoulder harness 8 comprising two straps secured to the front of the chair and passing over the occupant's shoulders and over a cross-bar 9 of the frame 6 and thence downwardly in the rear of the chair, the lower ends of the straps being joined together and secured to a clevis fitting 10. A cable 11 is secured to the clevis fitting 10 and passes downwardly through a conduit 12 on the chair 3 into operative connection with the safety reel.

The upper part of the new reel, as shown in Figure 3, is substantially identical to the reels shown in the Nordmark patents above identified, but is here secured to the underside of the chair seat instead of to the chair back as shown in Nordmark Patent No. 2,480,335. This upper part of the new reel comprises a base 13 and a casing 14 which forms part of the housing 1, and the base and the casing are secured together and to the underside of the chair seat by the bolts 4 and nuts 5. A centrally located, downwardly projecting spindle 15 is provided with an upper flange 16 thereon (see Figure 3) seated in a recess 17 in the base 13 and rigidly secured thereto by rivets 18.

A drum generally designated 19 is rotatably and longitudinally slidably mounted on the spindle 15, and one end of the cable 11 is secured to the drum 19 so that the cable may be wound thereon and unwound therefrom. The drum has in its lower portion a concentric annular recess in which is disposed a coil tension spring 20 the inner end of which is secured to the spindle 15 and the outer end of which is secured to the drum 19. The coil spring 20 tends to wind the cable 11 onto the drum 19 thus taking up any slack in the shoulder harness 8 and cable 11. This structure constitutes resilient means operatively connecting the harness to the support or housing 1 whereby the harness may normally yield to permit freedom of movement of the chair occupant.

Locking means are provided whereby under certain conditions the drum 19 is locked to the base 13 to prevent yielding of the harness 8 thus locking the chair occupant in the chair. These means comprise ratchet teeth 21 on the circular upper surface of the drum 19 adapted to interlock with complementary ratchet teeth 22 on a circular boss 23 on the underside of the base 13 whenever the drum 19 is caused to slide upwardly on the spindle 15. The ratchet teeth 21 and 22 are maintained in normal disengagement by means of a double leaf spring unit comprising opposing spring leaves 24 and 25 which normally urge the drum downwardly. If desired, the chair occupant may manually lock the ratchet teeth to secure himself in the chair by means of a control lever 26 having an operative connection with the drum through a control cable 27 and pivoted yoke 28, all as fully described in Nordmark Patent No. 2,480,335.

The novel operating parts of the present reel are enclosed in a cylindrical casing 29 forming part of the housing 1, said casing 29 depending coaxially from the casing 14 and being secured thereto by means of screws 30. The casing 29 has a central opening therethrough the upper and lower portions of which are enlarged to form upper and lower annular chambers 31 and 32 respectively. The middle portion of the central opening forms a vertical slide bearing 33 in which is slidably disposed a plunger 34 having an enlarged upper end 35 slidable within the annular upper chamber 31 and provided with a central bore 36 which slidingly embraces the lower end of the spindle 15. The extreme upper end of the plunger is flanged outwardly and bears against the drum 19, said drum being provided with a cover 37 for the drum's annular recess in which is disposed spring 29, and said cover forming the bearing surface against which the plunger bears. A helical spring 38 pressing against the casing 29 at the lower end of the chamber 31 and against the enlarged upper end 35 of the plunger 34, urges the drum upwardly toward ratchet engagement with the base 13 except when prevented from so doing by the restraining means hereinafter described. The upward force of the helical spring 38 when exerted on the drum 19 is greater than the downward force exerted by the double leaf spring 24—25 interposed between the drum and the base 13.

The lower end of plunger 34, within the lower chamber 32, has an enlarged foot 39 thereon. Detents 40 having their lower ends pivotally mounted adjacent the lower walls of chamber 32, are urged inwardly by springs 41 confined within cavities 42 in the casing 29 by means of screws 43, so that the heads 44 of said detents may engage the foot 39 on plunger 33. When so engaged, the spring 38 is restrained against exerting any force on the drum 19 and is thus rendered ineffective.

Multidirectional inertia - operable control means are associated with the detents 40 for disengaging the detents from the plunger's foot 39 upon varidirectional impact of the vehicle with an external object. As shown in Figure 3, an annular disc 45 is secured to the bottom of the casing 29 by means of screws 46, said disc 45 being provided with a recess 47 in the bottom thereof. A pendulum 48 depends from the disc 45 and has its circular upper edge 49 bearing against the shoulder 50 of the disc's recess 47. The pendulum is normally maintained in this position, as seen in solid lines in Figure 3, by means of a stem 51 connected to the pendulum 48 by a ball and socket joint indicated at 52. The stem 51 has a collar 53 thereon located within the chamber 32, and a spring 54 interposed between the collar 53 and disc 45 normally urges the stem upwardly. The upper end of the stem 51 has a head 55 thereon which is engageable with inward projections or lugs 56 on the detents 40 approximately midway between the upper and lower ends of the detents.

A cocking lever 57 pivotally mounted on lugs 58 on the exterior surface of the casing 29, extends through a slot 59 in the casing and has its inner end provided with a yoke 60 engaging in a reduced portion 61 of the plunger's middle portion 34.

Operation

Figure 2 diagrammatically illustrates various directions of impact which an airplane may make with the earth at the time of a crash. These are merely illustrative, and the present reel will operate by inertia to lock the airplane pilot in his seat regardless of the vehicle's direction of impact. When the impact occurs, pendulum 48 is swung out of its normal axial alignment with the plunger 34 and drum 19 as indicated by dotted lines in Figure 3. The pendulum fulcrums about the point of contact between its circular upper edge 49 and the shoulder 50 of the recess 47 in disc 45. Such movement of the pendulum 48 draws stem 51 downwardly, and the head 55 on said stem 51 presses against the lugs 56 on detents 40 thus camming the detents outwardly and disengaging the detents' heads 44 from the foot 39 of plunger 34. The plunger being thus released, it is forced upwardly by the helical spring 38 to its position shown in Figure 6 during which upward movement the plunger carries with it the drum 19 and the drum is thus forced into ratchet-interlocking engagement with the fixed base 13 of the reel. The cable 11 is thus locked against paying out and the pilot is secured in a rearward position in his seat. The mechanism may be manually reset for such inertia locking by means of the cocking lever 57, the outer end of which may be forced upwardly thus lowering plunger 34 against the force of spring 38 and causing the plunger's foot 39 to re-engage behind the heads 44 of detents 40.

It will thus be seen that the invention provides a multidirectional inertia-operated safety reel which is operable upon varidirectional impact of a moving vehicle with some external object, to lock an occupant of the vehicle in his chair and thus minimize the danger of injury to the occupant. While but one specific embodiment of the invention has been herein shown and described, it will be understood that numerous details may be altered or omitted without departing from the spirit of the invention as the same is defined by the following claims.

We claim:

1. For use in a vehicle chair having a harness for the chair occupant attached to said chair, a safety inertia-operable control device adapted to be secured to the free ends of said harness, said device comprising a drum rotatably mounted on the vehicle in association with the chair, a cable connected to the harness and to the drum whereby rotation of the drum in one direction winds the cable thereon to tighten the harness and opposite rotation of the drum unwinds the cable to relax the harness, a locking member on the vehicle and a cooperative locking member on the drum, one of said locking members being fixed relative to the vehicle and the other of said locking members being movable relative to the vehicle, a multidirectionally inertia-operable pendulum mounted on the vehicle, and means operatively connecting said pendulum to said movable locking member whereby inertia-effected movement of the pendulum relative to the vehicle moves the movable locking member into cooperative engagement with the fixed locking member to lock the drum against rotation in the direction which unwinds the cable.

2. For use in a vehicle chair having a harness for the chair occupant attached to said chair, a safety inertia-operable control device adapted to be secured to the free ends of said harness, said device comprising a drum rotatably mounted on the vehicle in association with the chair, a cable connected to the harness and to the drum whereby rotation of the drum in one direction winds the cable thereon to tighten the harness and opposite rotation of the drum unwinds the cable to relax the harness, ratchet means on the vehicle and cooperating ratchet means on the drum, one of said ratchet means being fixed relative to the vehicle and the other of said ratchet means being movable relative to the vehicle, a multidirectionally inertia-operable pendulum mounted on the vehicle, and means operatively connecting said pendulum to said movable ratchet means whereby inertia-effected movement of the pendulum relative to the vehicle moves the movable ratchet means into cooperative engagement with the fixed ratchet means to lock the drum against rotation in the direction which unwinds the cable.

3. For use in a vehicle chair having a harness for the chair occupant attached to said chair, a safety inertia-operable control device adapted to be secured to the free ends of said harness, said device comprising a drum rotatably mounted on the vehicle in association with the chair, a cable connected to the harness and to the drum whereby rotation of the drum in one direction winds the cable thereon to tighten the harness and opposite rotation of the drum unwinds the cable to relax the harness, a locking member on the vehicle and a cooperative locking member on the drum, one of said locking members being fixed relative to the vehicle and the other of said locking members being movable relative to the vehicle, a plunger slidably mounted on the vehicle and having an end thereof in engagement with said movable locking member whereby movement of the plunger toward the fixed locking member effects locking engagement of the locking members, spring means normally urging said plunger toward the fixed locking member, restraining means releasably securing said plunger in a retracted position, a multidirectionally inertia-operable pendulum mounted on the vehicle, and means operatively connecting said pendulum to said restraining means whereby inertia-effected movement of the pendulum relative to the vehicle releases the restraining means to permit forcing of said plunger toward the fixed locking member by said spring means.

WILLIAM R. NEAHR.
ROBERT L. DAVIS.

References Cited in the file of this patent

UNITED STATES PATENTS

| Number | Name | Date |
|---|---|---|
| 2,223,097 | Ehret | Nov. 26, 1940 |
| 2,240,085 | Wells | Apr. 29, 1941 |
| 2,403,653 | Geohegan | July 9, 1946 |
| 2,433,950 | Henderson | Jan. 6, 1948 |
| 2,434,119 | Nordmark | Jan. 6, 1948 |
| 2,480,335 | Nordmark | Aug. 30, 1949 |
| 2,499,993 | Gregg | Mar. 7, 1950 |
| 2,557,313 | Quilter | June 19, 1951 |